United States Patent [19]

Rafaels

[11] Patent Number: 4,777,785
[45] Date of Patent: Oct. 18, 1988

[54] METHOD OF GUIDING A ROBOTIC LAWNMOWER

[76] Inventor: Raymond J. Rafaels, 28 Newland Ct., Sterling, Va. 22170

[21] Appl. No.: 945,864

[22] Filed: Dec. 23, 1986

Related U.S. Application Data

[63] Continuation-in-part of Ser. No. 825,896, Feb. 4, 1986, abandoned.

[51] Int. Cl.⁴ .............................................. A01D 34/00
[52] U.S. Cl. .............................. 56/10.2; 56/DIG. 15
[58] Field of Search ................. 56/10.2, DIG. 15, 295; 250/202

[56] References Cited

U.S. PATENT DOCUMENTS

| | | | |
|---|---|---|---|
| 2,751,030 | 6/1956 | Null | 180/79.1 |
| 2,850,862 | 9/1958 | Asbury | 56/295 |
| 2,909,885 | 10/1959 | Smith | 56/25.4 |
| 3,425,197 | 2/1969 | Kita | 56/26 |
| 3,507,349 | 4/1970 | Comer | 180/98 |
| 3,550,714 | 12/1970 | Bellinger | 180/79.1 |
| 3,570,227 | 3/1971 | Bellinger | 56/25.4 |
| 3,650,097 | 3/1972 | Nokes | 56/10.2 |
| 3,789,939 | 2/1974 | Geislinger | 180/6.5 |
| 3,924,389 | 12/1975 | Kita | 56/10.2 |
| 4,133,404 | 1/1979 | Griffin | 180/79.1 |
| 4,318,266 | 3/1982 | Taube | 56/10.2 |
| 4,500,970 | 2/1985 | Daemmer | 364/513 |
| 4,545,453 | 10/1985 | Yoshimura et al. | 180/131 |
| 4,573,547 | 3/1986 | Yoshimura et al. | 180/168 |

Primary Examiner—Jerome Massie
Assistant Examiner—Matthew Smith
Attorney, Agent, or Firm—Lane & Aitken

[57] ABSTRACT

A method for guiding a robotic vehicle includes the steps of establishing a tracking position along a row of vehicle sensors at which the border is to intersect the row, positioning the vehicle on the border so that the border intersects the row at an intersecting position, generating a positive signal when a sensor senses any obstruction by vegetation of a path of radiation from a respective emitter to a respective detector, generating a negative signal when a sensor does not sense any obstruction, repeating said generating steps as said vehicle advances, sending a plurality of groups of said generated signals to a processor, averaging said signals, identifying the intersecting position by identifying an adjacent pair of oppositely signalling sensors on the basis of said averaging of said signals, determining whether the tracking position is at or to the right or left of the intersecting position, and steering the vehicle straight when the tracking position is at the same location as the intersecting position, to the left when the tracking position is to the right of the intersecting position, and to the right when the tracking position is to the left of the intersecting position.

10 Claims, 13 Drawing Sheets

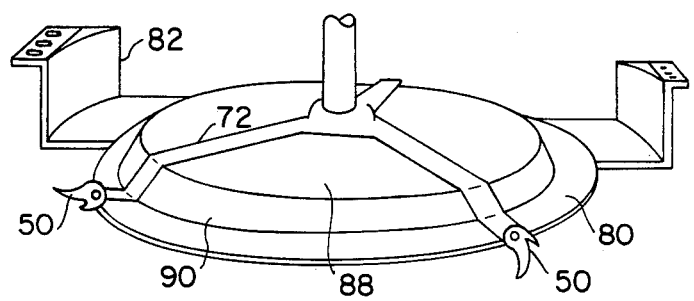
FIG. 5
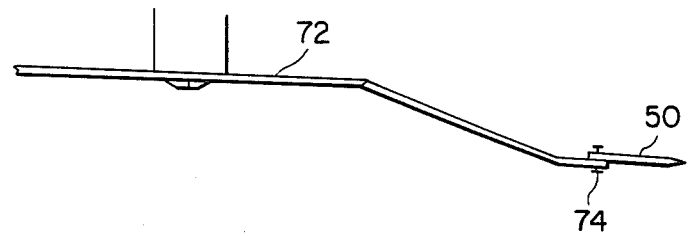
FIG. 6
FIG. 7
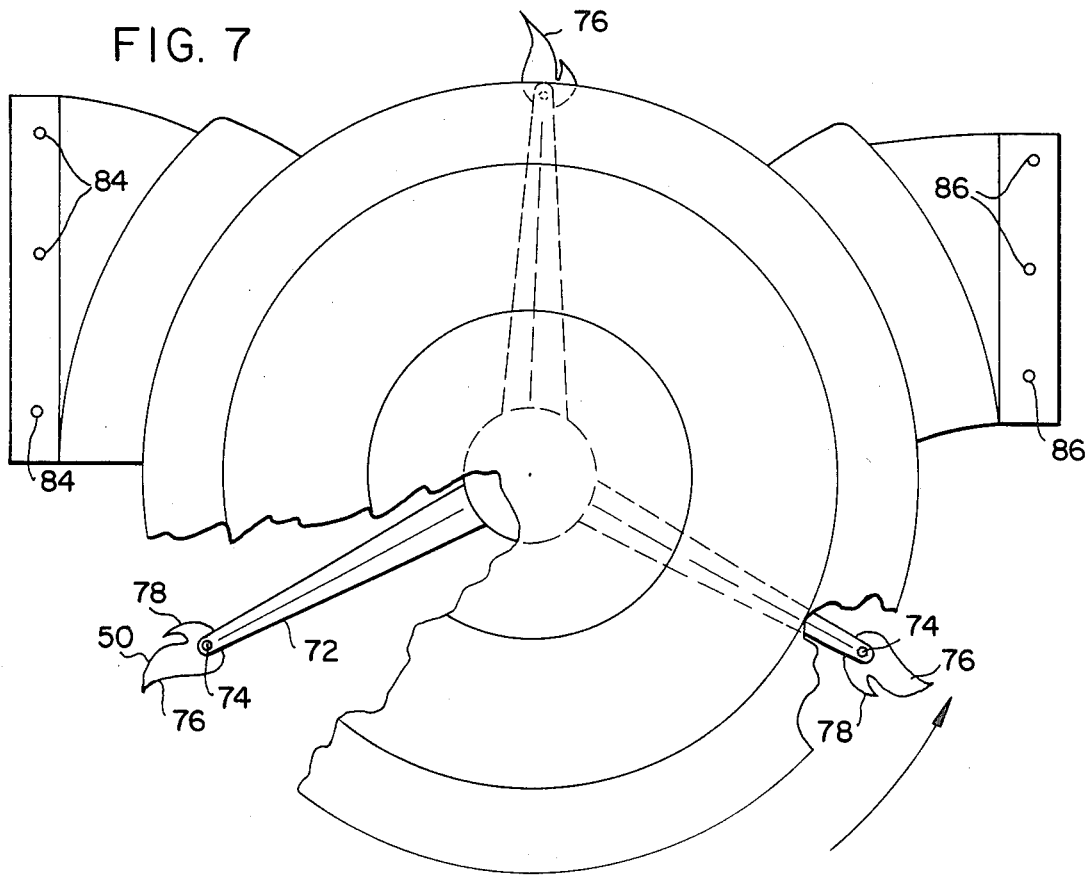

FIG. 8
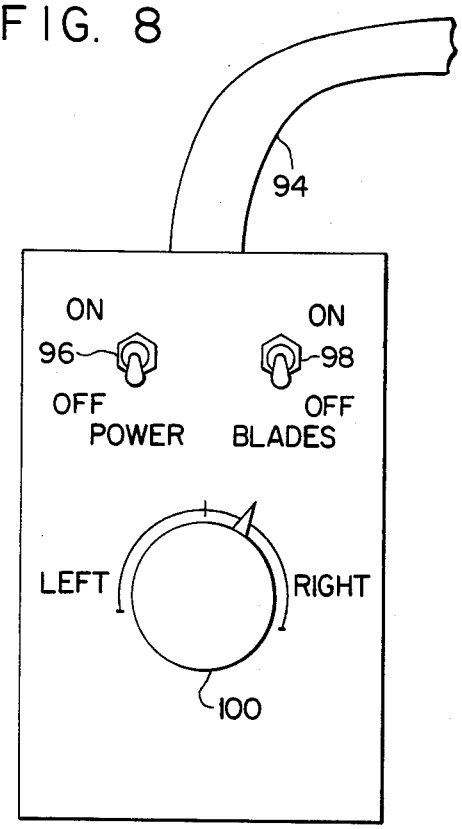
FIG. 10
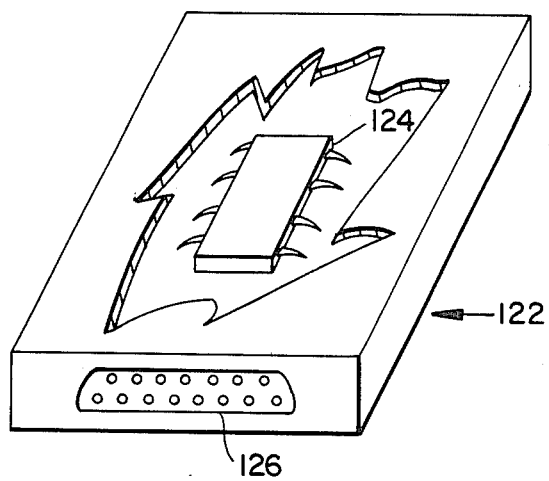
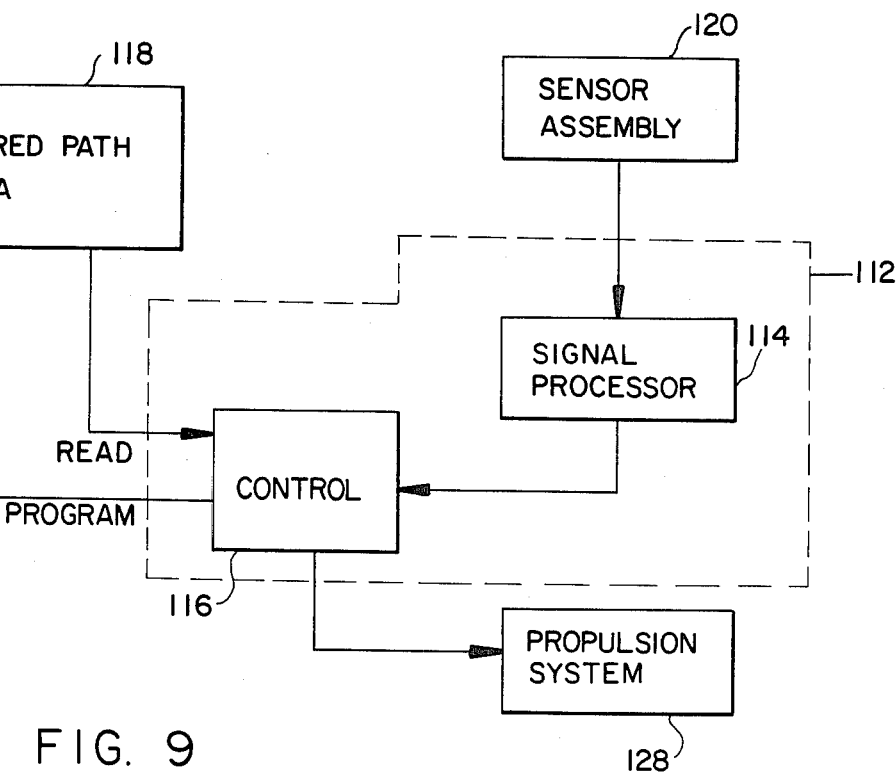
FIG. 9

| SENSOR NUMBER | #1 | #2 | #3 | #4 | #5 | #6 | #7 | #8 |
|---|---|---|---|---|---|---|---|---|
| DATA SAMPLE # | | | | | | | | |
| =1 | 0 | 1 | 1 | 0 | 1 | 0 | 0 | 0 |
| =2 | 1 | 1 | 1 | 0 | 0 | 0 | 0 | 0 |
| =3 | 1 | 0 | 1 | 1 | 0 | 0 | 0 | 0 |
| =4 | 0 | 1 | 1 | 0 | 0 | 0 | 0 | 0 |
| =5 | 1 | 1 | 0 | 1 | 0 | 0 | 0 | 0 |
| TOTAL SUM | 3 | 4 | 4 | 2 | 1 | 0 | 0 | 0 |
| MODIFIED SUM DATA = OUTPUT DATA | 1 | 1 | 1 | 0 | 0 | 0 | 0 | 0 |

FIG. 15

| HEX INPUT | HEX OUTPUT | HEX INPUT | HEX OUTPUT |
|---|---|---|---|
| 00 | 0 | 2E | 6 |
| 01 | 1 | 2F | 6 |
| 02 | 2 | 30 | 5 |
| 03 | 2 | 31 | 6 |
| 04 | 3 | 32 | 6 |
| 05 | 3 | 33 | 6 |
| 06 | 3 | 34 | 6 |
| 07 | 3 | 35 | 6 |
| 08 | — | 36 | 6 |
| 09 | 4 | 37 | 6 |
| 0A | 4 | 38 | 6 |
| 0B | 4 | 39 | 6 |
| 0C | 4 | 3A | 6 |
| 0D | 4 | 3B | 6 |
| 0E | 4 | 3C | 6 |
| 0F | 4 | 3D | 6 |
| 10 | — | 3E | 6 |
| 11 | — | 3F | 6 |
| 12 | — | 40 | — |
| 13 | — | 41 | — |
| 14 | — | 42 | — |
| 15 | — | 43 | — |
| 16 | 5 | 44 | — |
| 17 | 5 | 45 | — |
| 18 | 5 | 46 | — |
| 19 | 5 | 47 | 3 |
| 1A | 5 | 48 | — |
| 1B | 5 | 49 | — |
| 1C | 5 | 4A | — |
| 1D | 5 | 4B | — |
| 1E | 5 | 4C | — |
| 1F | 5 | 4D | — |
| 20 | — | 4E | — |
| 21 | — | 4F | 4 |
| 22 | — | 50 | — |
| 23 | — | 51 | — |
| 24 | — | 52 | — |
| 25 | — | 53 | 6 |
| 26 | — | 54 | — |
| 27 | 5 | 55 | 6 |
| 28 | — | 56 | 6 |
| 29 | 5 | 57 | 6 |
| 2A | 5 | 58 | — |
| 2B | 6 | 59 | 6 |
| 2C | 5 | 5A | 6 |
| 2D | 6 | 5B | 6 |

FIG. 16a

| HEX INPUT | HEX OUTPUT | HEX INPUT | HEX OUTPUT |
|---|---|---|---|
| 5C | 6 | 8E | 5 |
| 5D | 6 | 8F | 4 |
| 5E | 6 | 90 | — |
| 5F | 7 | 91 | — |
| 60 | — | 92 | — |
| 61 | — | 93 | — |
| 62 | — | 94 | — |
| 63 | — | 95 | 5 |
| 64 | — | 96 | 5 |
| 65 | 7 | 97 | 5 |
| 66 | 7 | 98 | — |
| 67 | 7 | 99 | — |
| 68 | 7 | 9A | 5 |
| 69 | 7 | 9B | 5 |
| 6A | 7 | 9C | 5 |
| 6B | 7 | 9D | 5 |
| 6C | 7 | 9E | 5 |
| 6D | 7 | 9F | 5 |
| 6E | 7 | A0 | — |
| 6F | 7 | A1 | — |
| 70 | 7 | A2 | — |
| 71 | 7 | A3 | — |
| 72 | 7 | A4 | — |
| 73 | 7 | A5 | — |
| 74 | 7 | A6 | — |
| 75 | 7 | A7 | 8 |
| 76 | 7 | A8 | — |
| 77 | 7 | A9 | — |
| 78 | 7 | AA | 8 |
| 79 | 7 | AB | 8 |
| 7A | 7 | AC | 8 |
| 7B | 7 | AD | 8 |
| 7C | 7 | AE | 8 |
| 7D | 7 | AF | 7 |
| 7E | 7 | B0 | 8 |
| 7F | 7 | B1 | — |
| 80 | — | B2 | — |
| 81 | — | B3 | 8 |
| 82 | — | B4 | — |
| 83 | — | B5 | 8 |
| 84 | — | B6 | 7 |
| 85 | — | B7 | 7 |
| 86 | — | B8 | 7 |
| 87 | 3 | B9 | 7 |
| 88 | — | BA | 7 |
| 89 | — | BB | 7 |
| 8A | — | BC | 7 |
| 8B | 5 | BD | 7 |
| 8C | 5 | BE | 8 |
| 8D | 5 | BF | 8 |

FIG. 16b

| HEX INPUT | HEX OUTPUT | HEX INPUT | HEX OUTPUT |
|---|---|---|---|
| C0 | — | F0 | 8 |
| C1 | — | F1 | 8 |
| C2 | — | F2 | 8 |
| C3 | — | F3 | 8 |
| C4 | — | F4 | 8 |
| C5 | — | F5 | 8 |
| C6 | — | F6 | 8 |
| C7 | 5 | F7 | 8 |
| C8 | — | F8 | 8 |
| C9 | — | F9 | 8 |
| CA | — | FA | 8 |
| CB | — | FB | 8 |
| CC | — | FC | 8 |
| CD | — | FD | 8 |
| CE | — | FE | 8 |
| CF | 7 | FF | 8 |
| D0 | — | | |
| D1 | — | | |
| D2 | 8 | | |
| D3 | 8 | | |
| D4 | 8 | | |
| D5 | 8 | | |
| D6 | 8 | | |
| D7 | 8 | | |
| D8 | 8 | | |
| D9 | 8 | | |
| DA | 8 | | |
| DB | 8 | | |
| DC | 8 | | |
| DD | 8 | | |
| DE | 8 | | |
| DF | 8 | | |
| E0 | 8 | | |
| E1 | 8 | | |
| E2 | 8 | | |
| E3 | 8 | | |
| E4 | 8 | | |
| E5 | 8 | | |
| E6 | 8 | | |
| E7 | 8 | | |
| E8 | 8 | | |
| E9 | 8 | | |
| EA | 8 | | |
| EB | 8 | | |
| EC | 8 | | |
| ED | 8 | | |
| EE | 8 | | |
| EF | 8 | | |

FIG. 16c

METHOD OF GUIDING A ROBOTIC LAWNMOWER

This is a continuation-in-part of U.S. patent application Ser. No. 825,896, filed Feb. 4, 1986, abandoned.

BACKGROUND OF THE INVENTION

1. Field of the Invention

This invention relates to a method for steering a robotic lawnmower, leaf-clearing or fertilizing apparatus.

2. Discussion of the Prior Art

Various robotic lawnmowers have been proposed which cut grass or other vegetation without requiring an operator to steer the mower while riding on or walking behind it. Some devices of this nature have relied solely on pre-programmed steering paths for guidance. U.S. Pat. No. 3,650,097 to Nokes illustrates an automatic lawnmower having a path that is pre-programmed on a plastic tape. U.S. Pat. No. 3,789,939 to Geislinger illustrates a programmable cart or lawnmower whose path is programmed on magnetic audio recording tape. Systems such as these are unsatisfactory because of their inability to correct steering errors due to wheel slippage, rough terrain or other obstacles.

Other robotic lawnmowers of the prior art, such as those disclosed by Bellinger in U.S. Pat. Nos. 3,550,714 and 3,570,227, avoid steering correction problems altogether by allowing the mower to move randomly within a boundary defined by a buried cable. When the lawnmower senses the buried cable, it steers away from the boundary toward the center of the bounded area. These systems are disadvantageous because they require a long time to complete the cutting operation. In addition, the task of burying a cable around the entire mowing area is time-consuming and expensive.

The most recent robotic lawnmowers typically utilize some means for self-tracking the cut-uncut grass border. U.S. Pat. Nos. 3,425,197 and 3,924,389, both to Kita, disclose robotic lawnmowers that track a cut-uncut grass border with sensors that are mounted on the front of the mowers. A minute electric signal is produced by each sensor assembly when it contacts the uncut grass. The signal is passed to an amplifier which then acivates a pair of clutch brake mechanisms for steering the mower along the edge of the border.

Other robotic lawnmowers use optical sensors to track the cut-uncut grass border. In U.S. Pat. No. 4,133,404 to Griffin, light is directed toward the border, and a plurality of sensors measures the intensity of the light after it has been reflected from the grass. The position of the cut-uncut grass border is determined by measuring a different reflected light intensity for the cut grass than for the uncut grass. However, if the light-intensity differential between cut and uncut grass is not severe, the system has a low probability of success. A second embodiment disclosed by Griffin employs metal "feelers" which contact the grass. To sense grass, these feelers must be light and sensitive, and their construction may accordingly cause sticking, clogging or breakage. Both types of sensors disclosed by Griffin rely on a complicated comparator method to determine the location of the grass border.

U.S. Pat. Nos. 4,545,453 and 4,573,547, issued to Yoshimura et al, describe automatic vehicles which also track the cut-uncut grass border with optical sensors. These vehicles, however, employ geomagnetic orientation sensors for the intended purpose of remedying the problem of vehicle zig-zagging due to irregularities in the border. The geomagnetic orientation sensors are used with the optical sensors to smooth out the steering of the vehicle.

While the inventors of the above mowing devices have made meritorious attempts to develop robotic machines that satisfactorily perform lawn-cutting operations, the prior art methods have for various reasons failed to satisfy all of the objectives required of such machines.

It is accordingly an objective of the present invention to provide a robotic device capable of efficiently cutting grass, clearing leaves or spreading fertilizer without the assistance of an operator.

It is a further objective of the present invention to provide an improved guidance and control system for a robotic lawnmower that is capable of smoothly tracking a cut-uncut grass border of a lawn with sensors.

A further objective of the invention is to provide a row of sensors that is adapted to detect the location of a cut-uncut grass border relative to the row regardless at which point the border and row of sensors intersect.

A further objective of the invention is to provide a guidance system that utilizes both pre-programmed path information and tracking sensors to guide the robot.

A further objective of the invention is to provide an improved apparatus for programming movement of a robotic lawnmower wherein the programming is accomplished by remotely controlling the movement of the robot over the desired path.

A further objective of the invention is to provide an improved flexibility in programming by allowing the programmed path to be altered by simply redirecting the robotic lawnmower remotely over the desired path.

A further objective of the invention is to provide an improved guidance system that utilizes a computerized digital method to steer the lawnmower straight and smoothly when the grass border is irregular or poorly defined.

A further objective of the invention is to provide a guidance system that can effectively operate even if one or more sensors are defective or blocked by grass, dirt or other debris.

A further objective of the invention is to provide a guidance system that utilizes a computer or other central processor that is capable of taking different courses of action in response to multiple input sensor data.

A further objective of the invention is to provide cutting blades that are safe and energy efficient.

A further objective of the invention is to provide a robotic lawnmower that has increased simplicity and reliability by utilizing very few moving mechanical parts and by utilizing a consolidated drive and steering mechanism that obviates the need for separate mechanisms.

A further objective of the invention is to provide a robotic lawnmower that is efficiently powered by battery.

A further objective of the invention is to provide interchangeable memory modules for the guidance system to enhance flexibility of operation.

Further objectives and advantages of the present invention will be apparent from the following detailed description and accompanying figures.

SUMMARY OF THE INVENTION

In order to satisfy these objectives, the present invention provides a method for guiding a robotic vehicle which includes a first step of providing the vehicle with a plurality of sensors, each sensor including an electromagnetic radiation emitter, an electromagnetic radiation detector and a space therebetween, a plurality of intermediate and terminal sensor support members arranged in a substantially linear row, each of the members supporting at least an emitter or a detector of one of the sensors, so that a plurality of spaces is defined between adjacent members, each of the spaces having an emitter on one side and a detector on another side, whereby paths of radiation between pairs of respective emitters and detectors are substantially parallel to the row, and a central processor adapted to receive signals from the sensors and identify a location of a traversing cut-uncut vegetation border relative to the row on the basis of the signals. A tracking position is established along the row of sensors at which the border is to intersect the row, and the vehicle is positioned on the border so that the border intersects the row at an intersecting position. A positive signal is generated when a sensor senses any obstruction by vegetation of a path of radiation from a respective emitter to a respective detector, the signal being essentially the same regardless of the degree of obstruction, and a negative signal is generated when a snesor does not sense any obstruction. A group of generated signals is sent to the processor to indicate the intersecting position of the border, and the processor identifies the intersecting position by identifying an adjacent pair of oppositely signalling sensors on the basis of the group of signals and determines whether the tracking position is at or to the right or left of the intersecting position. Finally, the vehicle is steered straight when the tracking position is at the same location as the intersecting position, to the left when the tracking position is to the right of the intersecting position and to the right when the tracking position is to the left of the intersecting position.

BRIEF DESCRIPTION OF THE DRAWINGS

FIG. 5 is a perspective view of one of the cutting blade assemblies of the lawnmower of FIG. 3.

FIG. 6 is a side elevational view of a portion of the cutting blade assembly of FIG. 5.

FIG. 7 is a bottom view of the cutting blade assembly of FIG. 5, one of the parts being partially cut away and other parts being shown in phantom.

FIG. 8 is a plan view of a typical remote controller used to manually control the robotic lawnmower of FIG. 3.

FIG. 9 is a block diagram of the guidance and control system of the lawnmower of FIG. 3.

FIG. 10 is a perspective view of a removable module employed in the guidance and control system of FIG. 9.

FIG. 15 illustrates a computer averaging method utilized by the central processor.

FIGS. 16 (a) through (c) constitute a digital look-up table in accordance with the present invention.

DESCRIPTION OF THE PREFERRED EMBODIMENTS

In the following description of the preferred embodiments of the present invention, specific terminology will be resorted to for the sake of clarity. However, it is not intended to limit the disclosure to the specific terms so selected, and it is to be understood that each specific term includes all technical equivalents that operate in a similar manner to accomplish a similar purpose. The scope of the invention is intended to cover alterations and further modifications in the illustrated device, and further applications of the principles of the invention as illustrated therein, as would normally occur to one skilled in the art to which the invention relates.

Figure 1:
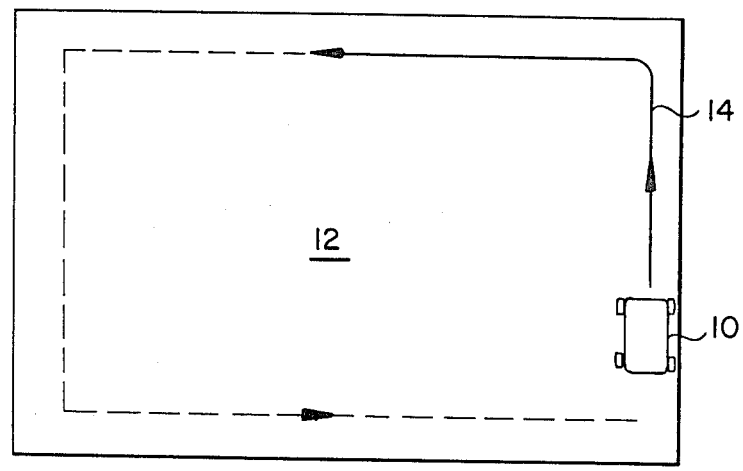
FIG. 1 is an aerial view of the robotic lawnmower cutting and memorizing the outer periphery of a lawn.
Figure 2:
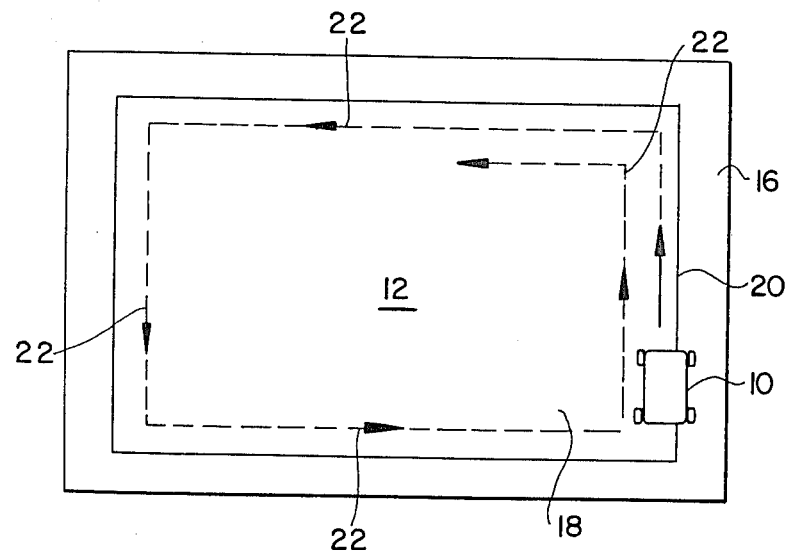
FIG. 2 is an aerial view of the robotic lawnmower beginning the automatic cycle of tracking the cut-uncut brass border of the lawn.

FIGS. 1 and 2 are aerial views of robotic lawnmower 10 positioned on a rectangular lawn 12. In FIG. 1, an initial step of the cutting operation is depicted, wherein the lawnmower cuts a periphery 14 of the lawn, preferably by remote control. In an alternative embodiment, the lawnmower is provided with an upwardly extending handle, and the operator pushes the lawnmower about the periphery with the handle. Regardless of the manner by which the outer periphery is cut, the lawnmower in a preferred embodiment is equipped with a means for automatically registering and recording the distances travelled along the various vectors of travel along outer periphery 14.

After outer periphery 14 is cut, borders are cut around trees and other obstacles in the lawn. This allows the robot to steer around obstacles while cutting in the automatic mode of operation. These borders are cut, in a preferred embodiment, by first remotely steering the robot to each obstacle while the cutting blades are turned off, and then steering around each obstacle with the blades turned on. This procedure is repeated for all obstacles within periphery 14.

FIG. 2 illustrates lawnmower 10 in an automatic cutting operation. Following the cutting of periphery 14, lawn 12 contains an area 16 of cut grass and a larger, central area 18 of uncut grass. To initiate the automatic cutting operation, lawnmower 10 is positioned such that it straddles border 20 between the cut and uncut areas. The robot is then manually switched to automatic control, and sensors located near the front of the mower, which are in a preferred embodiment optical sensors, provide information concerning the position of the cut-uncut grass border to an on-board information processor, to thereby provide for automatic guidance of the robot for the remainder of the cutting operation. When lawn 12 has no obstacles, the mower moves inwardly in a spiral pattern defined by arrows 22 until the entire lawn has been cut. When obstacles are present, the spiral pattern is interrupted when the lawnmower encounters a border around an obstacle, whereupon the lawnmower traces around the border of the obstacle and then resumes the inward spiral pattern.

Figure 3:
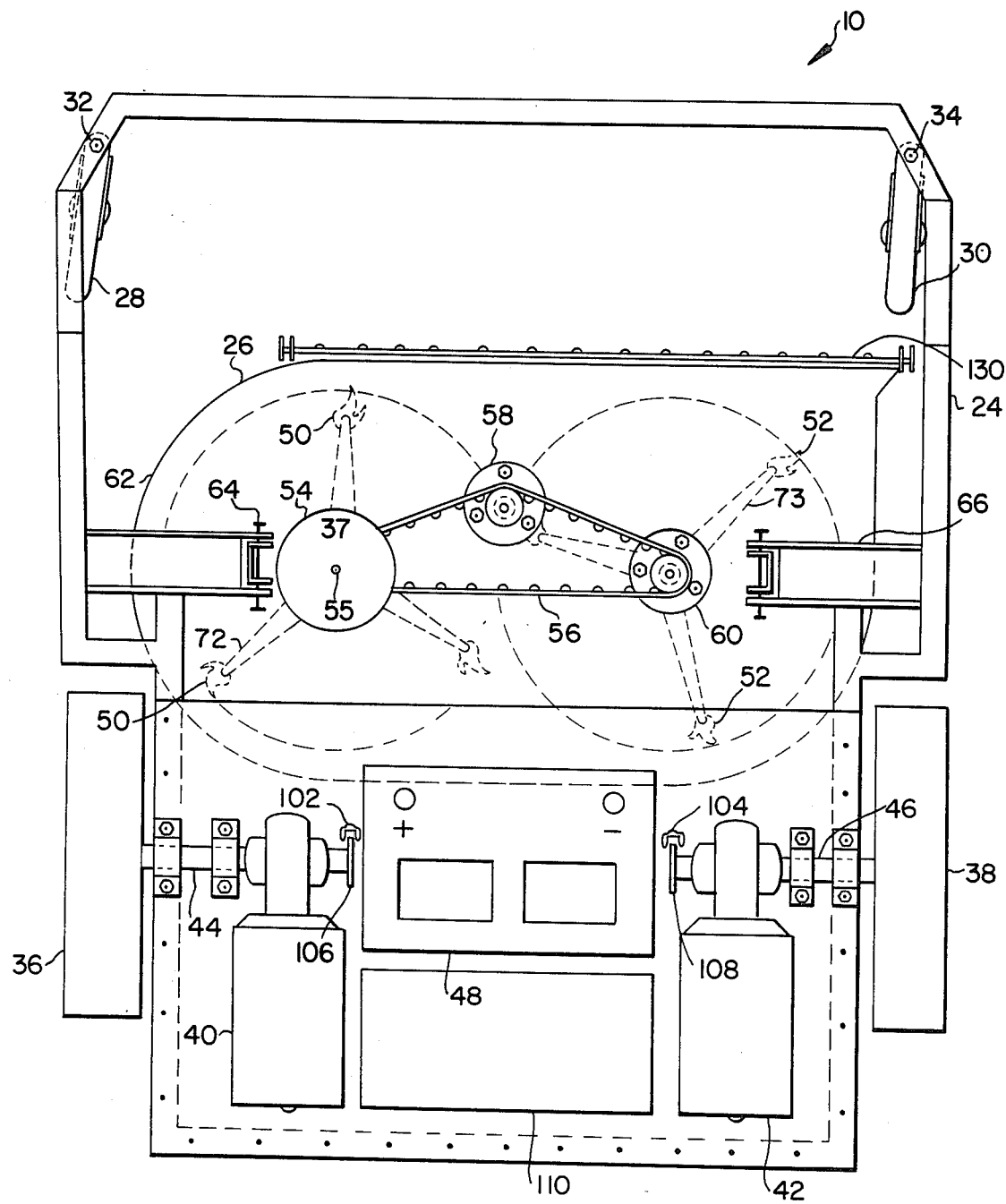
FIG. 3 is a plan view of the robotic lawnmower in a preferred embodiment, partially shown in phantom.
Figure 4:
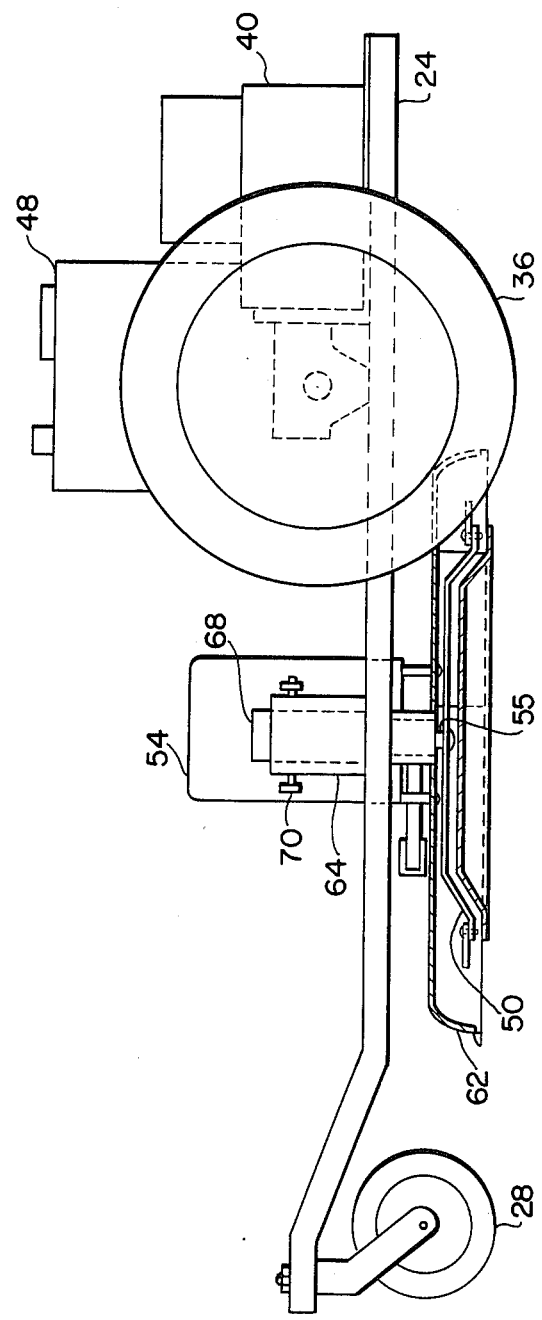
FIG. 4 is a side-elevational view of the robotic lawnmower of FIG. 3, partially in section and partially in phantom.

FIGS. 3 and 4 illustrate a preferred embodiment of robotic lawnmower 10. The lawnmower comprises frame 24 and cutter assembly 26 and is similar in operation and design to that disclosed in U.S. Pat. No. 3,570,227, issued to Bellinger. Frame 24 is supported by caster wheels 28, 30 which pivot about points 32, 34. Frame 24 is also supported and driven by drive wheels 36, 38, and drive motors 40, 42 are coupled to the drive wheels through axles 44, 46. Each drive wheel is independently driven by its respective motor, such that the robot steers to the right when drive wheel 36 is driven faster than drive wheel 38, and the robot steers to the left when drive wheel 38 is driven faster than drive wheel 36. Electrical power is supplied to drive motors 40, 42, as well as to other electrically powered elements, by battery 48. Power is supplied at least to the drive wheels by a gasoline engine in an alternative embodiment.

Cutter assembly 26 comprises cutting blades 50, 52, which are carried respectively by rotors 72, 73. The motor drives rotor 72 directly by shaft 55 and drives rotor 73 via timing belt 56 and pulleys 58, 60. Blades 50, 52 are protected by housing 62, which is best depicted in FIG. 4. The housing is supported by mounting brackets 64, 66 which allow the blade height to be adjusted by movig extensions of the blade housing up or down within the brackets. Two extensions, one extension 68 of which is depicted in FIG. 4, are attached to housing 62 and releasably secured within the mounting brackets by respective bolts. As depicted in FIG. 4, bolt 70 secures shaft 68 within bracket 64.

The cutting blade arrangement is depicted in more detail in FIGS. 5 through 7. FIG. 5 is a perspective view of cutting blades 50 which are pivotably attached to the arms of rotor 72. Blades 50 are free to pivot about pins 74, and centrifugal forces move blades 50 radially outward when rotor 72 rotates.

Blades 50 are designed to maximize avoidance of injury, while at the same time providing for efficient cutting of grass. The blades are preferably razor sharp but are of such light weight that they impact with a minimum of force on obstacles such as rocks, feet or hands. Rotor 72 is also lightweight, such that it has a low moment of inertia. The lightweight assembly is rotatable at a maximum angular velocity by motor 54, and the high speed increases the cutting action of the blades. However, if blades 50 strike a hand or foot, cutting edges 76 are deflected backwards. Tabs 78 provide counterbalancing to help maintain the blades in an extended position during the cutting of grass.

Additional safety is provided by guard 80. The guard is supported by bracket 82, which is in turn bolted to the underside of housing 62 at points 84, 86. Guard 80 is dish-shaped and of a diameter somewhat smaller than a radially extending dimension of the rotor and blade, such that substantially only cutting edges 76 of the blades extend beyond the guard's periphery. The guard is also provided with a raised central portion 88 and a slanted annular portion 90 that correspond in shape to the arms of rotor 72. The guard protects the rotor from obstacles and protects the hands and feet of an operator from the spinning rotor. The guard also relieves motor 54 from undue drag caused by grass or other obstacles which might otherwise contact the rotor from beneath the cutting assembly. Thus, the guard and cutting blade arrangement maximizes the efficiency achievable by motor 54 to cut grass, while at the same time providing maximal safety to the operator and any other individuals that might be in the vicinity of the lawnmower.

The travel of the lawnmower in a first step of the cutting operation has been illustrated in and discussed in connection with FIG. 1. During this step, the lawnmower is remotely steered about periphery 14 with a wireless or wired control unit. In a preferred embodiment, the means for controlling the initial cutting is cable-connected unit 92 as illustrated in FIG. 8. Unit 92 is small enough to be hand-held and is connected by way of 6-foot cable 94 to lawnmower 10. Toggle switch 96 switches all of the power from battery 48 on and off. Toggle switch 98 switches the power from battery 48 to motor 54 on and off. Rotatable potentiometer 100 controls the direction of the lawnmower by controlling the relative speeds of drive wheels 36, 38 with respect to one another. Rotation of potentiometer 100 to the right causes the lawnmower to move to the right, and rotation of potentiometer 100 to the left causes the lawnmower to move to the left. The manner by which switches 96, 98 and potentiometer 100 control current within the lawnmower is conventional and well known to those skilled in the art.

Lawnmower 10 includes a means for registering and recording the path followed by the lawnmower in the initial cutting of the periphery of the lawn. In a preferred embodiment, the registering means consists of optical sensors 102, 104 which are disposed about optical interrupter wheels 106, 108, as illustrated in FIG. 3. Together, the optical sensors and interrupter wheels constitute optical tachometers. As the angular velocity of a drive wheel increases, the frequency of pulses emitted from a respective optical sensor increases, such that the increase the pulse frequency is directly proportional to the increases in angular velocity. Optical tachometers suitable for use in the present invention are manufactured by several companies, one example being the HEDS-5000 Series of optical tachometers manufactured by Hewlett-Packard. Magnetic-reluctance type tachometers are also suitable.

The robotic control of the lawnmower is provided by an electronics package that is contained in electronics housing 110. As illustrated in FIG. 9, the electronics package consists of a central processor 112, which includes signal processor 114 and control 116, programmable memory 118 and sensor assembly 120. Memory 118 contains instructions for central processor 112, and also contains information regarding paths, such as the peripheral path followed by lawnmower 10 in FIG. 1. In a preferred embodiment, the memory that contains path information is contained in a removable module, such as module 122 in FIG. 10. Module 122 is preferably provided with a plastic or metal housing approximately the size of an audio cassette tape and is further provided with a memory-integrated circuit (IC) 124, such as EPROM, EEPROM, bubble memory or equivalent. Connector 126 is mounted on an end of the module to allow it to be mated with a printed circuit board of control 116. The operation of central processor 112 is described in more detail in connection with FIG. 14.

Information concerning the peripheral path followed by the mower in the initial cutting step is programmed into memory 124 by means of the optical tachometers. As the robot is steered over the initial peripheral path, digital information containing the number of revolutions each wheel has travelled with respect to each other is passed from the tachometers to controller 116 and then to memory 118. After the periphery is cut, control 116 is switched to receive signals from sensor assembly 120 through signal processor 114, a will be discussed hereinbelow.

Having stored information concerning the peripheral path of an area to be cut, subsequent cutting of the same area does not require an operator to steer the robot over the outer periphery. Instead, the operator need only place the robot at the beginning of the path that was programmed into memory, and then switch the control to read the path information from memory 118. The information causes drives wheels 36, 38 of propulsion system 128 to move in the exact same pattern in which they originally moved when the path information was being entered into the memory. At the end of the stored path, the controller automatically switches to receive signals from the sensor assembly.

A series of memory modules 122 allows an operator to store information specific to a number of peripheral paths of interest. In order to transfer from one path to another, the operator need only disengage one memory module and insert another. In another embodiment, information concerning different paths is isolated within a single data bank, and means for selecting information respective of a particular path is provided in accordance with conventional computer technology that is well known to those skilled in the art.

Less precise path guidance is required for certain non-cutting operations, such as fertilizing, leaf clearing, etc. Accordingly, in certain applications, guidance supplied solely from path information stored in memory modules is adequate. When clearing leaves, a powerful air blower capable of blowing leaves into rows or piles is suitably mounted on the robot. Piles or rows of leaves are strategically formed for easy manual pickup as the robot travels over the preprogrammed path.

Figure 11:
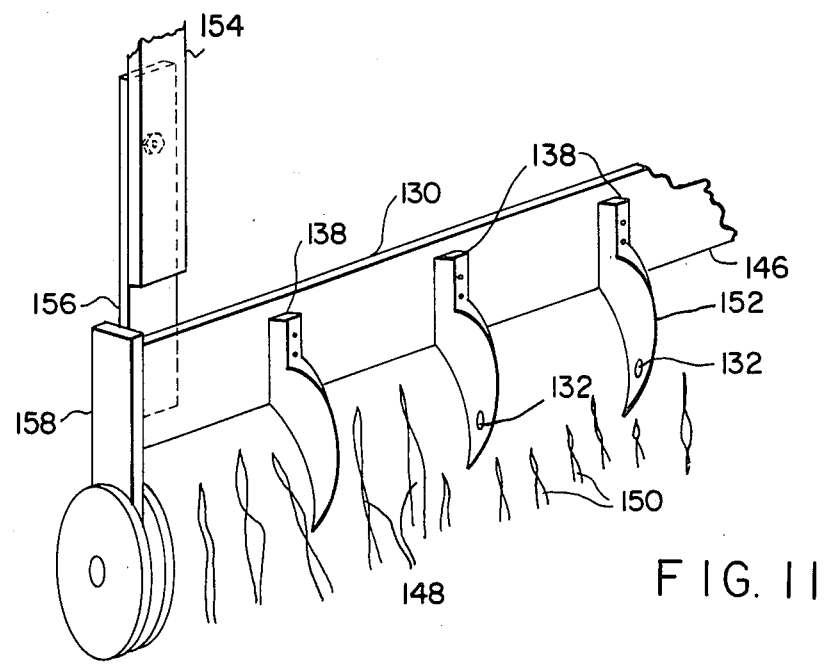
FIG. 11 is a perspective view and FIG. 12 is a front elevational view of the sensor assembly of the depicted lawnmower.
Figure 12:
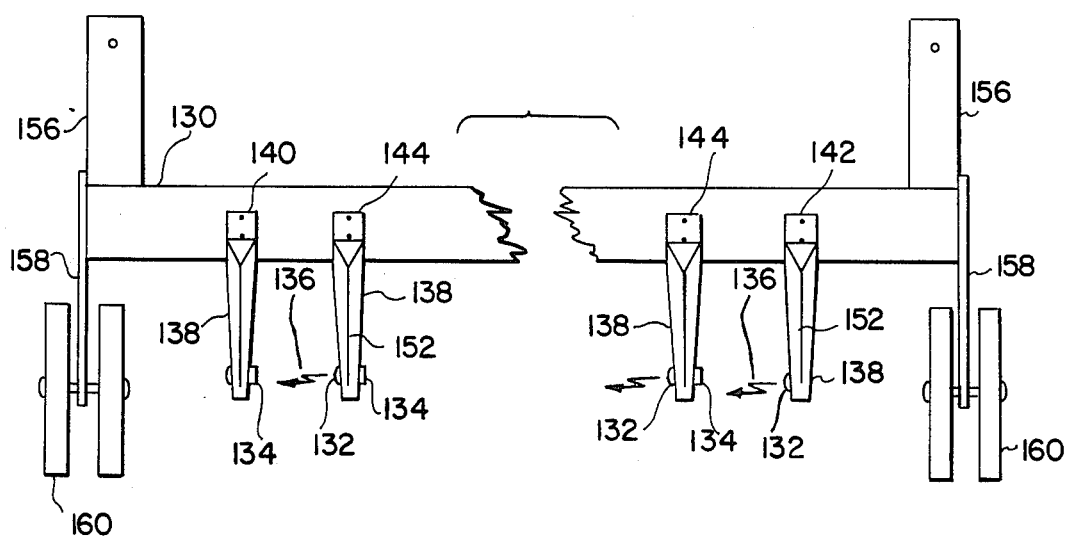

The robotic lawnmower is steered by means of sensors during the second step of the cutting operation that is depicted in FIG. 2. As illustrated in FIG. 3, a plurality of sensors is arranged in a row and affixed to a carrier 130, which in the depicted embodiment is in turn affixed to cutter assembly 26 in front of blades 52. As best depicted in FIGS. 11 and 12, each sensor comprises an electromagnetic radiation emitter, which is in a preferred embodiment an infrared radiation emitter 132, an electromagnetic radiation detector, which in a preferred embodiment is an infrared radiation detector 134, and respective spaces 136 between facing pairs of emitters and detectors.

Each sensor is adapted to generate either a positive signal when vegetation, such as grass, obstructs a path of radiation from the emitter to the detector, or a negative signal when no vegetation obstructs the path, and these signals are sent to control 116 after being processed by processor 114. In a preferred embodiment, the positive signals do not vary to register varying amounts of vegetation that obstruct the paths, such that a positive signal means that there is anywhere from a slight degree of obstruction to total obstruction. In the prior art, signals that reflect varying degrees of obstruction have resulted in a need for highly complex signal processing.

The sensors are supported by a plurality of support members 138 which, in the depicted embodiment, are arranged in a fashion such that the entire area between a first terminal member 140 and a second terminal member 142 is capable of being monitored by the plurality of sensors. In order to accomplish this, each intermediate member 144 is provided with an emitter 132 of one of the sensors and a detector 134 of another of the sensors, and each terminal member 140, 142 is provided with an emitter or a detector of one of the sensors. In an alternative embodiment, every other intermediate member is provided with two emitters on either of its sides, and the remaining intermediate members are provided with two detectors on either of their respective sides. In still another embodiment, each intermediate support member carries only an emitter or a detector, such that every other space defined by said member is a dead space and the remaining spaces are monitored by sensors. This latter embodiment is preferred for economical reasons, since it allows more area to be covered by fewer sensors. Regardless of the particular arrangement of emitters and detectors, the path taken by radiation passing from an emitter to a detector of each sensor is parallel to the row of sensors.

Support members 138 are affixed to carrier 130 by any suitable means. The members are configured in such a fashion that they extend downwardly beyond lower limit 146 of carrier 130. The emitters and detectors are positioned on the downwardly extending portions such that uncut grass 148 passing underneath mower 10 obstructs a path of radiation from the emitters to the detectors of the sensors, while cut grass 150 does not obstruct the path of radiation. When grass obstructs the radiation path of a sensor, the sensor generates a positive signal indicative of the presence of grass. When grass does not obstruct the radiation path of a sensor, the sensor generates a negative signal indicative of the absence of grass.

It is also within the scope of the present invention that one of the two possible signals, for example, the negative signal, will be in the form of a lack of an actual signal, whereby the signal processor 114 registers any actual signal to indicate the presence of vegetation and any lack of an actual signal to indicate the absence of vegetation. In the following claims, "signal" is used in this broad sense. In order to help ensure that any uncut grass is registered by the sensors, members 138 are slender and provided with ridges 152 in the depicted embodiment. At least six sensors and seven support members have been found to be suitable to control the automatic guidance system without the need for additional geomagnetic sensors or other guidance means. In a preferred embodiment, as depicted in FIG. 3, fifteen sensors are used. respective emitters and detectors of the fifteen sensors are preferably spaced about one-half inch apart, and dead spaces of about one inch are preferably provided between the sensors, so that the row of sensors is about 22 inches long.

Carrier 130 is affixed to the front of cutting assembly 26 by means of rods 154 and small spring steel bands 156. Rods 154 are rigid, but bands 156 are resilient and absorb the shock of any obstacles that may strike members 138, thus helping to protect them. Carrier 130 is also attached to plates 158, which in turn carry wheels 160. The wheels protect members 138 in the event that abrupt changes in ground elevation occur.

Figure 13:
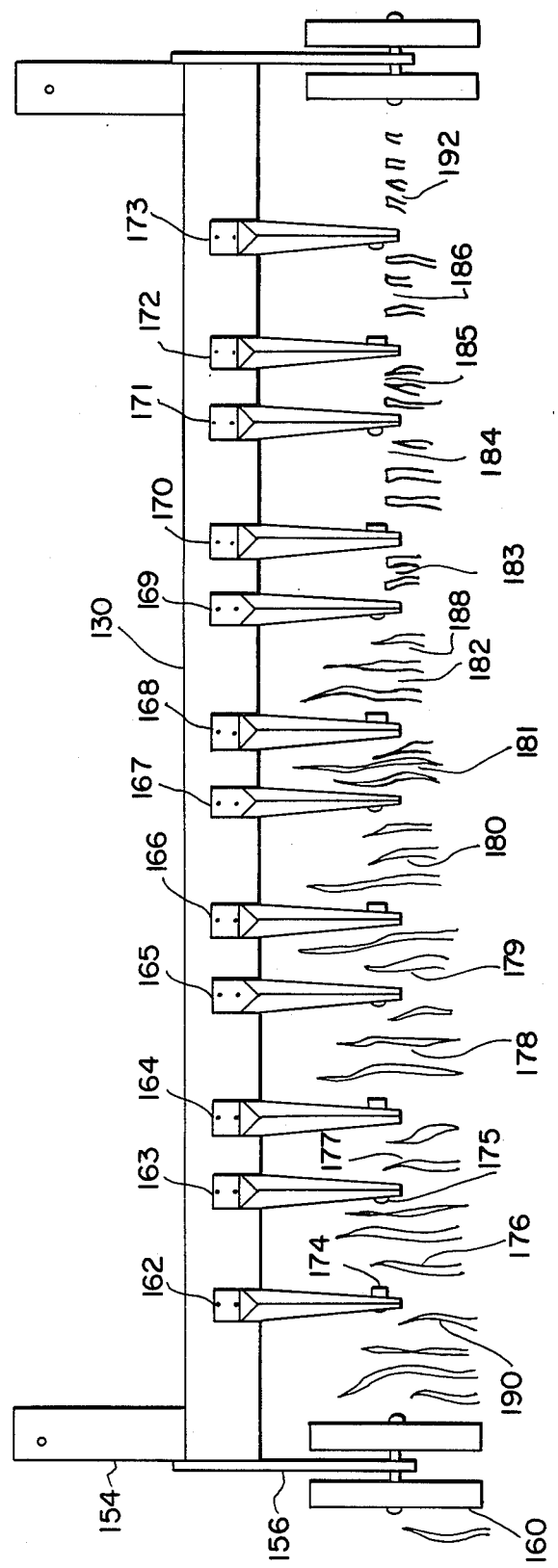
FIG. 13 is a front elevational view of a sensor assembly of an alternative embodiment.

During the automatic step of cutting, the sensors send signals which allow the central processor to sense the position of the cut-uncut grass border relative to the row of sensors, and hence, relative to the mower itself. The manner by which the signals are processed to identify the position of the cut-uncut grass border varies in accordance with several alternative embodiments of the invention. These alternative operations will be discussed hereinbelow in connection with FIG. 13, which depicts a sensor assembly provided with support members 162 to 173, arranged such that members 162, 164, 166, 168, 170 and 172 are provided with detectors 174, and members 163, 165, 167, 169, 171 and 173 are provided with emitters 175. Monitored spaces are thus provided between adjacent member pairs 162 and 163, 164 and 165, 166 and 167, 168 and 169, 170 and 171, and 172 and 173. The remaining spaces are dead spaces. The sensor assembly is located on a cut-uncut border 188 between an area 190 of uncut grass and an area 192 of cut grass. Spaces 176, 177, 178, 179, 180 and 181 are disposed on the uncut side of border 188, while spaces 183, 184, 185 and 186 are disposed on the cut side. Space 182 straddles the cut-uncut border. The sensor associated with space 182 and the sensor associated with space 184 are a pair of oppositely signalling sensors, and the border is also straddled by this pair.

Signal processor 114 processes the signals provided by the sensors to identify the location of the cut-uncut border relative to the row of sensors. This location is, in one embodiment, the entire area covered by the oppositely signalling pair. In another embodiment, a more narrow reference point is selected, such as a midpoint between the sensors of the pair. The so-identified location is transmitted to propulsion system 128, where it is used to direct the guidance of the robotic vehicle. A predetermined tracking location is selected at a point along the row of sensors, for example, at space 180, and system steers robot 10 to the left as long as the processor identifies the border location as being to the left of the tracking location and steers robot 10 to the right as long as the processor identifies the border location as being to the right. Steering to the left is accomplished by rotating drive wheel 38 faster than drive wheel 36, and steering to the right is accomplished by rotating drive wheel 36 faster than drive wheel 38. The robot is steered straight, by rotating the drive wheels at equal rates of speed, as long as the processor identifies the border location as being at the tracking location. Numerous other specific ways in which information regarding the position of the cut-uncut border is used to direct the guidance of the mower will be readily apparent to those skilled in the art.

Figure 14:
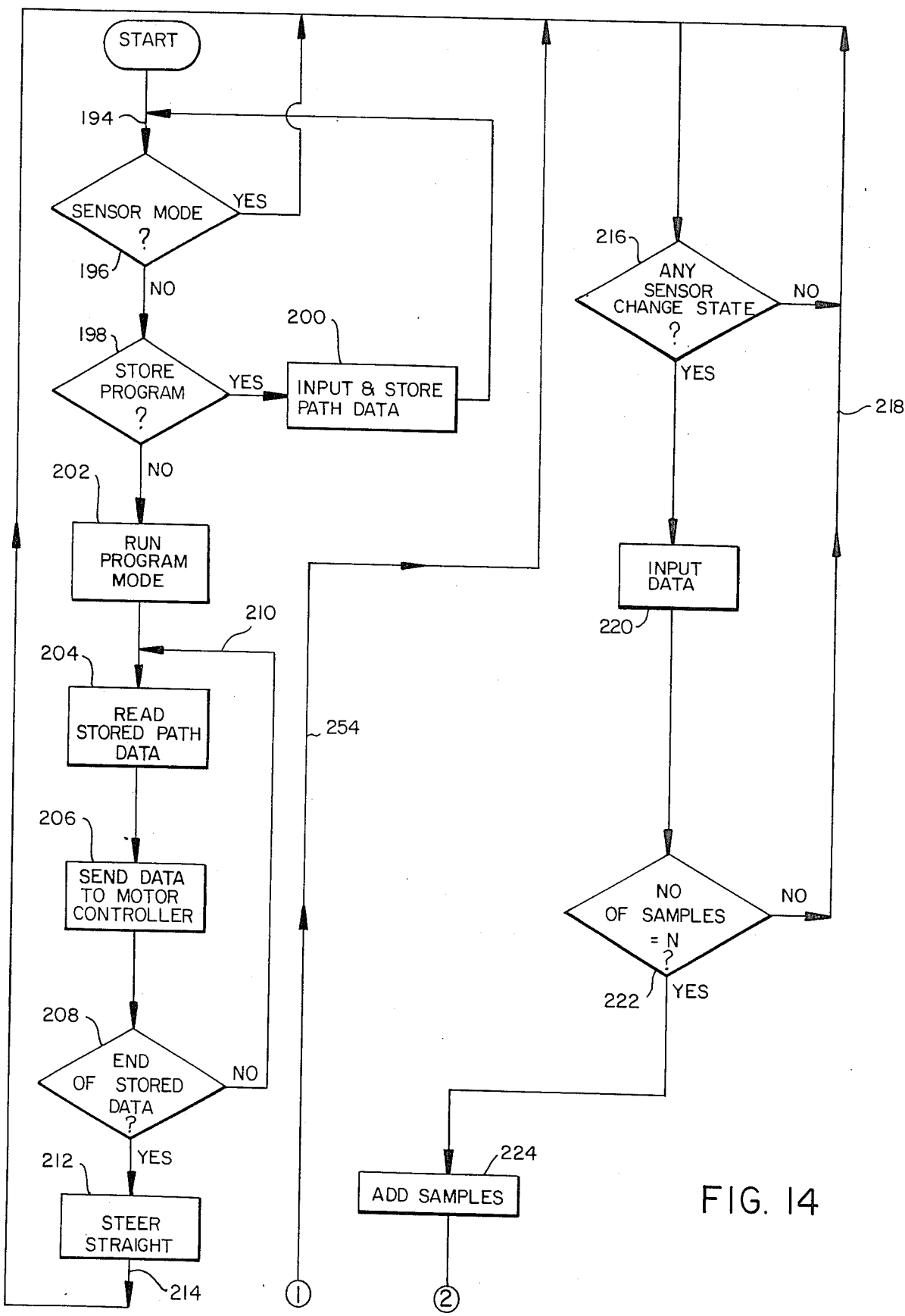
FIG. 14 is a process flow diagram of the central processor of the lawnmower.
Figure 14:
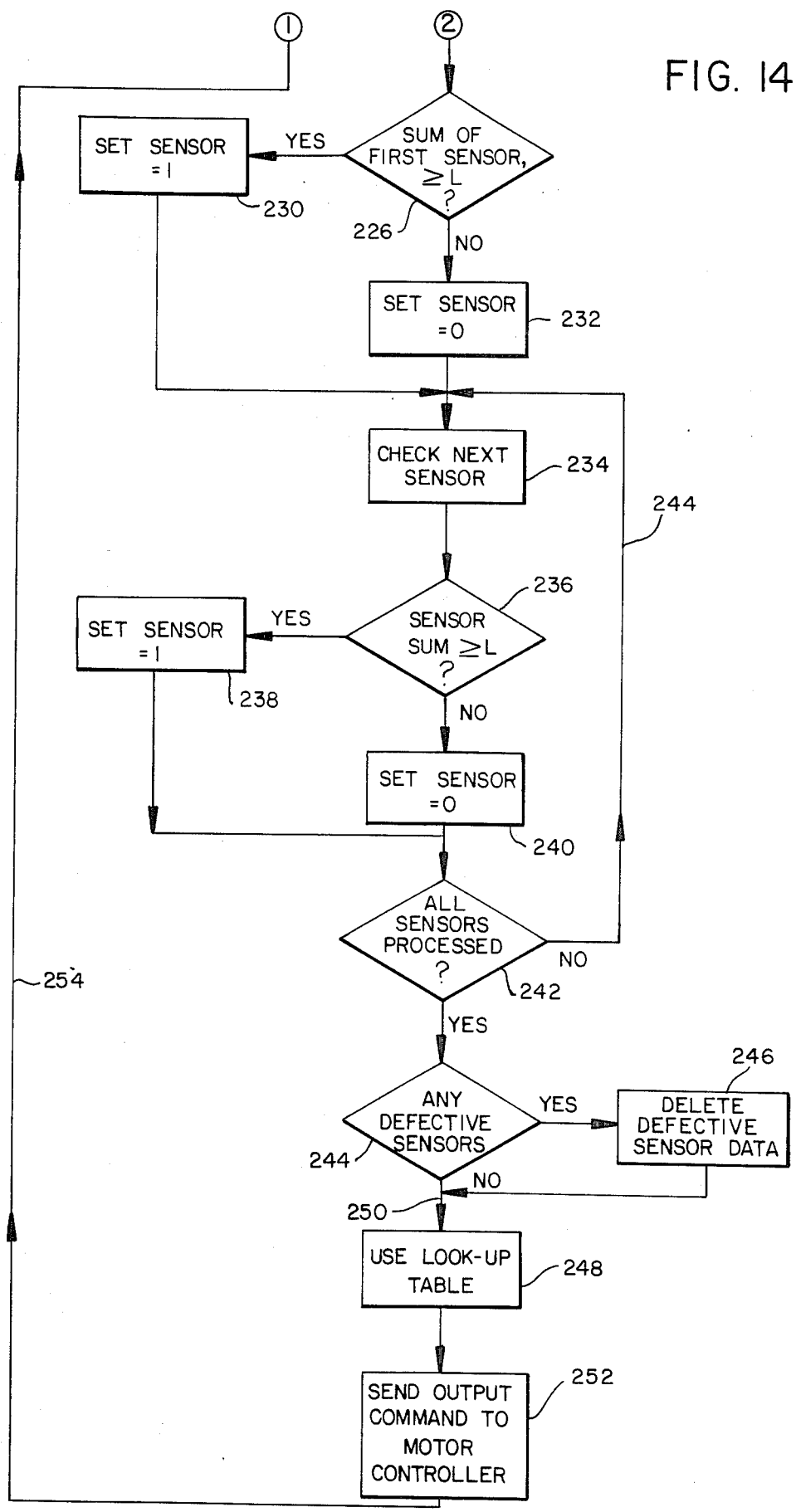

A process flow diagram of the present method is illustrated in FIG. 14, where each diamond-shaped box represents a decision point and each rectangular box represents an activity. At point 194, processor 112 checks to see if the operator has chosen sensor mode 196. The robot is exclusively guided by means of processed sensor data when operating in this mode. If the decision is "no," the process flows to decision point 198, where processor 112 checks to see if the operator has selected the store program mode. Path information is automatically stored as the robot is remotely steered by the operator when the robot operates in this mode. If the decision is "yes," the computer initiates activity 200, which is to input and store path information. If the decision is "no," run program mode 202 is activated, whereupon the robot is steered by processing previously stored path information. In this mode, the computer reads stored path information at point 204 and transfers the data to motor controller at point 206. This operation continues until all of the stored path information has been tranferred, the computer checking for the end of the stored path data at decision point 208. As long as the end of the data is not detected, the process loops back on line 210 to read more data at point 204. If the end of stored path data is detected, a "yes" decision causes the robot to be commanded to steer straight 212. The computer then enters into the sensor mode of operation which begins at arrow 214.

Each time a detector of the sensors is blocked by a blade of grass, a digital "1," or positive signal, is recorded. If the receptors are unblocked and light from a respective emitter is clearly received by a detector, a digital "0," or negative signal, is recorded. A typical data word from eight sensors is "00-111011," each sensor corresponding to a digit. The sensors are numbered from left to right, so that the first sensor registers a "0," the second sensor registers a "0," the third sensor registers a "1," and so forth. The process flows to decision point 216, where the controller checks to see if any sensor has changed its logical state. This process continues to loop back on line 218 until a change in state is detected. Decision point 216 is replaced by a timer function in an alternative embodiment. The timer function allows data to be entered only after a specific time period has expired.

If a change in state is detected at point 216, the decision is "yes," and data from each sensor is simultaneously or sequentially recieved at point 220 by the signal processor. The process then flows to decision point 222, where the processor checks to see if "N" samples have been received. "N" is any number from 1 to 1,000, preferably at least 5. The number is 5 in the preferred embodiment depicted in FIG. 15. In this embodiment, the computer must receive five samples before the process moves to activity 224, where the samples are added. The process then flows to decision point 226, where the processor checks the sum of the first sensor's data to see if it is greater than or equal to a predetermined threshold value "L." A "1" indicates that a signal was positive, and a "0" indicates that a signal was negative. "L" is any number from 1 to 1,000 and is selected such that a number equalling or exceeding it indicates the presence, or in an alternative embodiment, the absence, of grass. The value is 3 in the preferred embodiment illustrated in FIG. 15. If the sum of the first sensor is greater than or equal to 3, the decision at point 226 is "yes," and the data from the first sensor is changed to a "1" in activity 230. If the decision is "no," the data from the first sensor is changed to a "0" in activity 232. After the data from the first sensor has been processed in this way, the process flows to activity 234, where the processor checks the data for the next sensor. Decision point 236 decides whether the value for the second sensor is greater than or equal to threshold value L. If the decision is "yes," the data sum is changed to a "1" in activity 238, and if the decision is "no," the data sum is changed to a "0" in activity 240.

The process of changing the data sums to a "0" or a "1" is repeated for each of the eight sensors, and the process flows to decision point 242, where the processor determines when all of the data sums have been converted. Until they have been, a "no" decision causes the process to loop back on line 244 to activity 234, where data from the sensors continues to be processed.

The conversion step accomplished by comparing tabulations to a threshold value L is in a sense an averaging technique, equivalent to the computation of a mean, and it serves the purpose of discounting the consideration given abberrant signals. In other embodiments of the present invention, a median or mode is computed to achieve the same result. The term "average" is used herein broadly to refer to all of these types of comutations, and other discounting methods will be apparent to those skilled in the art.

After all of the sensor data has been processed, the process moves to decision point 244, where the signal processor checks for defective sensors by monitoring the random pattern of "1's" and "0's" generated by each sensor. A sensor is considered defective by the computer if it outputs a continuous pattern of "1's" for a long period of time. If the decision is "yes" at point 244, the process flows to activity 246 where the processor sets the defective portion of the data word to "0." If the decision is "no," then the process flows to activity 248, where the binary word resulting from the comparison of each sensor to threshold L is compared to a look-up table.

A look-up table in accordance with the present invention is illustrated in FIG. 16. The table is in hexadecimal form. A hex input respective of a binary word is inputted, and a hex output corresponding to the input is used to idenfity a position of the cut-uncut grass border. The hex output indicates with a position number the sensor that straddles the cut-uncut border. When a reliable estimate of the border location cannot be obtained from the information provided, such condition being indicated by a hyphen in FIG. 16, the process loops back to decision point 216.

The look-up table is in some cases necessary, because it is possibe to obtain two or more pattern changes in the data after the summation of activity 224 is completed. More than one pattern change in the data would erroneously indicate two or more cut-uncut grass borders. For example, a typical data word obtained at point 250 is 00111011, indicating that the cut-uncut grass border is not only straddled by adjacent pair of oppositely signalling sensors 2 and 3, but also straddled by adjacent pair of oppositely signalling sensors 5 and 6 and/or adjacent pair of oppositely signaling sensors 6 and 7. The look-up table provides a corrected value of 00111111, indicating a grass border only within the outer limits of sensors 2 and 3.

After the data is sent through the look-up table, it is sent to activity 252 which in turn transfers it to the motor controller. The data sent to the motor controller allows the robot to accurately track the cut-uncut grass border. After the data is sent to the motor controller, the process loops back on line 254 to decision point 216, whereupon the sensor mode of operation is repeated.

In an alternative embodiment, steps 216 to 248 are deleted, and instead a single group of positive and negative signals is generated by the sensors and used by the processor to identify the location of the cut-uncut border. In this embodiment, the processor identifies the adjacent pair of oppositely signalling sensors as straddling the border. If more than one adjacent pair of oppositely signallng sensors is identified, the central processor either ignores the data or selects the pair that is closest to a preselected terminal end of the row of sensors.

In a further, preferred embodiment, a plurality of groups of signals is generated by the sensors and sent to the central processor, and the processor selects, from all of the pairs identified in any group, the adjacent pair of oppositely signalling sensors that is closest to the preselected terminal end. Preferably, the plurality of groups is very large, and at least 100. In still another embodiment, groups of signals are generated only periodically, or groups of signals are sent only periodically, or both, such that there is a delay of a predetermined amount of time before information from the sensors is processed by the central processor.

The output data is sent from the motor controller to the propulsion system, which converts the digital data to an analog signal through the use of a digital-to-analog converter. The analog signal is positive if the cut-uncut grass border lies to the right of the predetermined tracking location, negative if the border lies to the left of the tracking location, and zero if the border is at the tracking location. The polarity and strength of the analog signal steers the robot accordingly. Since data sent to the propulsion system is composed of several samples of sensor data, the steering provided by the guidance system is smooth regardless of irregularities in the grass border.

In order to maximize the safety in operation of the present invention, several additional features are added in a preferred embodiment. A contact-sensitive bumper is applied at least to the forward edge of the frame, so that the robot automatically shuts off if and when it is contacted by a human being or other obstacle. A radio-controlled signaller is provided for carrying by the operator, whereby the operator is provided with an audible or visual signal that indicates that the robot has stopped or malfunctioned. An enclosing shell is preferably provided to cover essentially the entire apparatus, with appropriate openings to allow easy access to make necessary adjustments. A contact-sensitive element is provided in another embodiment to the shell so that the robot is deactivated in the event that children attempt to ride it. Finally, in another preferred embodiment, ultrasonic sensors are affixed to the machine, for example on the shell, to sense nearby motion and thereby cause deactivation of the robot.

We claim:

1. A method for guiding a robotic vehicle comprising the steps of:

providing said vehicle with a plurality of sensors, each sensor comprising an electromagnetic radiation emitter, an electromagnetic radiation detector and a space therebetween, a plurality of intermediate and terminal sensor support members disposed in a substantially linear row, each of said members supporting at least an emitter or a detector of one of said sensors such that a plurality of spaces is defined between adjacent members, each of said spaces having an emitter on one side and a detector on another side, whereby paths of radiation between pair of respective emitters and detectors are substantially parallel to said row, and a central processor adapted to identify a location of a traversing cut-uncut vegetation border relative to said row on the basis of said signals;

establishing a tracking position along said row of sensors at which said border is to intersect said row;

positioning said vehicle on said border such that said border intersects said row at an intersecting position;

advancing said vehicle along said border;

generating a positive signal when a sensor senses by obstruction, regardless of amount, by vegetation of a path of radiation from a respective emitter to a respective detector;

generating a negative signal when a sensor does not sense any obstruction by vegetation of said path;

repeating said generating steps as said vehicle advances;

sending a plurality of groups of said generated signals to said processor before identifying said intersecting position of said border;

averaging said signals of said plurality of groups;

identifying said intersecting position by identifying an adjacent pair of oppositely signalling sensors on the basis of said averaging of said signals and determining whether said tracking position is at or to the right or left of said intersecting position; and steering said vehicle straight when said tracking position is at said intersecting position, to the left when said tracking position is to the right of said intersecting position, and to the right when said tracking position is to the left of said intersecting position.

2. The method of claim 1 wherein said step of establishing comprises the steps of:

placing said vehicle on said border such that it intersects said row at a position intended to be said tracking position;

generating a positive signal when a sensor senses any obstruction by vegetation of a path of radiation from a respective emitter to a respective detector, said signal being essentially the same regardless of degree of obstruction;

generating a negative signal when a sensor does not sense any obstruction by vegetation of said path;

sending a reference group of said generated signals to said processor to indicate said tracking position of said border;

identifying a reference pair of adjacent, oppositely signalling sensors on the basis of said reference group of signals; and registering said reference pair as straddling said border, such that said tracking position is established as being adjacent to said reference pair.

3. The method of claim 2 wherein said step of placing comprises the steps of causing said vehicle to complete a preprogrammed path and finish said path at said position intended to be said tracking position.

4. The method of claim 1 wherein said step of averaging comprises the steps of individually tabulating signals received for each sensor, such that a respective tabulation is made for each of said sensors, and comparing each of said respective tabulations to a preselected threshold value, said value being indicative of the presence or absence of vegetation at a sensor, whereby tabulations equalling or exceeding said value are converted to revised indications of the presence or absence of vegetation at respective sensors, wherein said adjacent pair of oppositely signalling sensors is identified on the basis of said revised indications.

5. The method of claim 1 wherein said plurality of groups numbers at least five.

6. The method of claim 1 wherein said step of identifying comprises the step of matching said revised indications to an input side of a table, said table comprising an output value for every possible combination of revised indications, each output being preselected to identify said pair of oppositely signalling sensors among concurrently occurring other pairs of oppositely signalling sensors when it is more probable that said pair straddles said border.

7. The method of claim 1 wherein, when there are more than one adjacent pair of oppositely signalling sensors, said step of identifying comprises the step of selecting one of said pairs that is closest to a terminal end of said row.

8. The method of claim 7 wherein said step of selecting involves a selecting of said one closest pair from any one of said plurality of groups.

9. The method of claim 8 wherein said plurality of groups numbers at least 100.

10. The method of claim 1 further comprising the step of delaying said generating steps and/or said sending step for a predetermined period of time.

* * * * *